J. E. MITCHEL.
Churns.

No. 133,717.  Patented Dec. 10, 1872.

Witnesses: James E. Mitchel, Inventor.

UNITED STATES PATENT OFFICE.

JAMES E. MITCHEL, OF PARIS, CANADA.

IMPROVEMENT IN CHURNS.

Specification forming part of Letters Patent No. 133,717, dated December 10, 1872.

*To all whom it may concern:*

Be it known that I, JAMES ELIJAH MITCHEL, of Paris, Ontario, Canada, have invented certain new and useful Improvements in Churns; and I do hereby declare that the following is a description thereof, reference being had to the accompanying drawing forming a part of this specification, in which—

Figure 1:
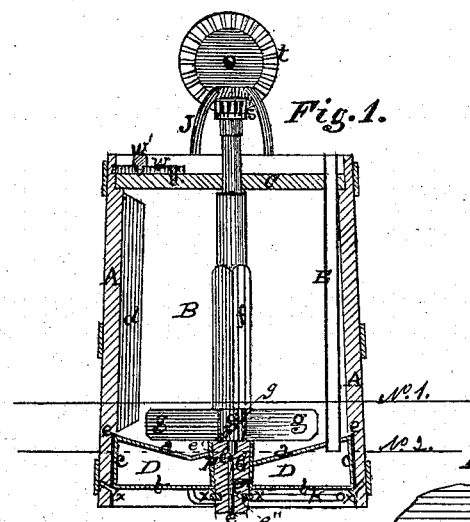
Figure 2:
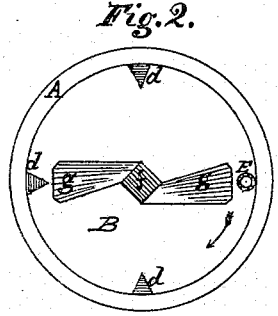
Figure 3:
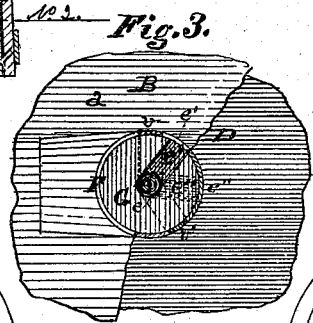
Figure 4:
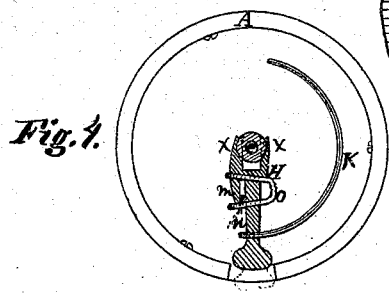
Figure 5:
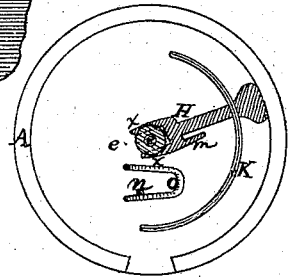
Figure 6:
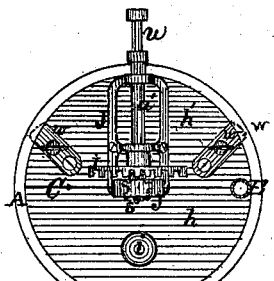

Figure 1 represents a sectional elevation of the churn embodying the improvements in this invention; Fig. 2 is a vertical view taken at line No. 1 in Fig. 1; Fig. 3 is a vertical view of the construction of the device for drawing off the water, and also the buttermilk, taken at line No. 2 in Fig. 1; Fig. 4 is a vertical view, taken from beneath, further illustrating the device for drawing off the water and buttermilk; Fig. 5 is a view of the same with lever moved; and Fig. 6 is a vertical view of the top of the churn and the gear and frame, showing the manner of attaching the driving-gear to the churn.

My invention relates to certain improvements in churns; and consists in certain arrangements and combinations of elements whereby the milk or cream to be churned can be raised to a given temperature by the introduction of warm or cool water, as may be required, into a separate chamber; and the said water can be readily removed from the said chamber into a vessel placed beneath the churn; and the buttermilk be also drawn from the body of the churn after the butter has been gathered; and the cream or milk be prevented from circling around the axis of the churn by the action of the revolving dasher; and the cream be acted upon so as to receive an upward and outward direction of current; and also several other results, hereafter explained, will be produced, all of which tend to give ease of operation and effect the churning in an expeditious manner, and render the several parts of the churn convenient for operation.

To enable other skilled in the art to make and use my invention, I will proceed to describe it in reference to the drawing and the letters of reference marked thereon, the same letters indicating like parts.

In the drawing, A represents the body of the churn, which may be constructed of staves, as in ordinary churns. B is the milk or cream chamber. C is the cover. In the lower portion of the body of the churn I place the water-chamber D, which is made close on all its sides, top, and bottom in such a manner as to have no communication with the cream-chamber B above. The upper shell $a$ of the said water-chamber forms the bottom of the cream-chamber, and is made of sheet metal—such as zinc or tin, or other equivalent metal, which will be a conductor of heat—while the sides $c$ and bottom $b$ may be made of either metal or wood. The said upper metal shell $a$ is made concave or funnel-shaped, in such a manner that the height of the water in the said water-chamber will be greater in depth at its outer portions than central in the same, and by such greater depth for water the body of warm water used will be made to longer preserve its desired temperature, while at the same time the funnel-shape of the bottom of the cream-chamber formed by the said shell $a$ will operate to gather the cream, when its quantity is small, and enable it to be as effectively operated upon as if the quantity were larger, and with greater advantage than if spread over a flat-bottom surface, as heretofore in churns; and with a larger quantity of cream the said funnel-form of bottom-surface tends to effect a greater pressure of the cream on the surface of the bottom of the chamber while it is being operated upon, because of its tendency to gravitate toward the center, which is not had in flat-bottom churns. The said water-chamber is to form the bottom of the cream-chamber B and to make the jointure of the shell sides $c\ c$ water-tight with the body of the churn. I form in the sides of the staves an annular recess, which will terminate, at any proper distance up from the bottom edge of the churn, (where the bottom of the cream-chamber will set,) with a shoulder, $e$, as shown in Fig. 2, against which the upper surface of the shell corner $a\ c$ will strike, when the vessel comprising the chamber D is inserted. The said shoulder $e$ of the annular recess I would then pack with putty or cement, or with any suitable packing material which would make the joint water-tight, when the said water-vessel was inserted into its place, where it could be secured by screws or by stays $x\ x$ from the under side, as shown in Fig. 1. The upper shell of the water-chamber D is made to slope from its sides toward the center, as in Fig. 1, to cause the buttermilk to flow toward the center of the bottom when being drawn off. E is a tube commencing with an open end above the cover C, and terminating into the water-chamber D, Fig. 1. By this tube it is intended to conduct warm or cold water into the said chamber, as may be required, to increase or lower the temperature of the cream to be churned. The water so used, being poured into the said tube by means of a funnel inserted in the open end of the top, will fill the chamber D, and either warm or cool the milk or cream resting on the bottom a or shell, by conduction, and maintain a temperature of about 62°, which can be indicated by a thermometer attached to the churn. d d d are stops secured to the inside of the body A, at intervals from six to ten inches apart, more or less, according to the size of the churn and the number used. The said stops run vertically from the top to the bottom of the chamber B, as shown, and are intended to prevent the cream from circling unresistingly around a central axis while being operated upon by the revolving paddles or dasher. F is a cock or faucet placed centrally through the chamber D, and rises above the sunken or more depressed portion of the bottom a of the cream-chamber, as shown in Fig. 1. The key G of the said faucet is pierced with a central discharge-hole, e, and with a horizontal port, e', intersecting with the vertical discharge-hole e, and placed at a point ranging with the lowest point of the sloping bottom a, through which port e' and discharge-port e the buttermilk is to be drawn when the churning is done, the milk flowing from the chamber B into the port e' through the opening v, Fig. 3, when the key G of the cock is turned in the faucet so as to bring the port e' opposite to the opening v, as indicated by dotted lines in Fig. 3. A second horizontal port, e'', is also made in the key G, communicating to the discharge-hole e, through which the water in the chamber D is to be drawn off when the key is turned to bring the said port e'' to face the opening v' made on the side of the faucet and communicating with said chamber, as indicated by dotted lines in Fig. 3. By this arrangement of the several ports in the key G, and the openings to the cream and water chamber, and the vertical discharge-hole, the contents of the two chambers can be drawn off separately, and at such times as may be desired, into any vessel or vessels that may be placed beneath the churn, the liquids from both chambers passing through the one and same faucet. H is a lever-wrench placed beneath the bottom of the water-chamber D, with its two jaws x x grasping the flattened sides of the key, indicated by dotted lines in Figs. 1, 4, and 5. By means of the said wrench the key G of the faucet can be so turned as to bring the port e' in a position to communicate with the opening v of the milk-chamber B, to draw off the buttermilk, or be turned from the said opening to close the same and prevent the milk escaping. The said wrench is also to be used to operate the key G to draw from the chamber D or to close the same. By turning the lever H to the right, as in Fig. 5, the port e will be made to face the opening v to the cream-chamber B, while the port e'' will be from the opening v' to the water-chamber. A further movement to the right will close both ports e' and e''; yet I would not be understood that I do confine myself to the precise location of the several ports and openings, as they may be varied somewhat from what I show, as may be desired; but in all cases I would so arrange the position of the said ports and openings that by properly turning the key by the wrench either port can be opened or closed independent of the other, and both be closed at the same time, as may be required. K is a guard secured to the bottom of the churn in any proper manner to support the handle of the lever H, when it may be turned to position shown in Fig. 5. m is a finger made on the wrench H, as shown in Figs. 4 and 5, which operates with the guide-piece n, when the lever is drawn back, to cause the jaws to release the key of the faucet, as shown by dotted lines in Fig. 4, when the said key can be removed from its faucet and be cleaned. o is any proper supporting-piece which is attached to the bottom of the churn, and is intended to support the lever-wrench when it is drawn back for the removal of the key of the faucet. To agitate the cream in a thorough manner I use two or more horizontal revolving paddles, g g, secured to the vertical shaft f, the lower end of which shaft is provided with a pintle, which sets into a proper hole made in the upper end of the key G of the faucet, as shown in Fig. 1, while the upper end of the said shaft passes up through the cover C, and is steadied by the frame J, Figs. 1 and 4. The paddles are made with a twist or pitch somewhat similar to that on a propeller-screw, as shown by dotted lines g in Fig. 1. By this peculiar form of the paddles the cream will be somewhat forced upward and out toward the stops d d when the said paddles are made to revolve, and the cream resting on the bottom a will be made continually to change its place, being carried upward, so that all portions of the cream will be brought in contact with the bottom a, to be either warmed or cooled, and made to have the desired temperature; and, further, the outward throw of the cream toward and against the stops d d will cause a violent agitation and thorough breaking of the butter-cells in the cream, and thereby bring the butter in a very short time. The cover C is made in halves, and the portion h can be readily removed by being lifted up by the knob i. To the portion h' of the cover C I attach the frame J J, which supports the gearing intended to drive the paddles, which gearing consists of the pinion s and the gear t, which are actuated by the crank u connecting with the shaft u', on which the gear t is placed. The said portion h' of the cover sits in an annular recess, shown in Fig. 1, and is kept firmly in its place by means of the buttons $w$ $w$ pivoted to the cover, and working with their loose ends into the sides of the churn, as shown in Figs. 1 and 6. A tightening-screw, $w'$, is used with each button to bind the cover tightly down to the shoulder of the recess in which the cover sits. Being thus arranged and secured to the cover, the said gearing can be readily detached from the churn when it is desired to pour in the cream, or remove the butter, or for cleaning the churn, and can be as readily replaced when it is desired to operate; and this mode of attaching the frame of the gearing to the cover permanently, and rendering the cover removable with the frame and gearing, dispenses with the usual expensive churn-frame, and obviates the necessity of bolting of any frame-work to a side of the body of the churn.

By the several improvements in this invention the temperature of the cream can be brought to a proper state, and there maintained in a simple and expeditious manner; and the water and the buttermilk can be readily drawn off when the churning operation has been finished; and the several parts of the churn can be readily removed for cleaning; and the milk will be thoroughly agitated and broken up; and the paddles be made to operate in an easy and continuous manner.

Having described my invention, what I claim, and desire to secure by Letters Patent, is—

1. The sheet-metal funnel-shaped shell $a$, in combination with the water-chamber D and cream-chamber B, whereby the said shell will be made to constitute the top cover of the said water-chamber and the bottom of the cream-chamber, substantially as and for the purpose set forth.

2. The combination of the faucet F having a vertical discharge-hole, $e$, communicated to by the ports $e'$ and $e''$ from the openings $v$ and $v'$, with the cream-chamber B and the water-chamber D, whereby the liquids in the said chambers can be drawn off separately by the one and same faucet, substantially as and for the purpose set forth.

3. The combination of the lever-wrench H and its finger $m$ with the guard K, guide-piece $n$, and support $o$, and cock F, substantially as and for the purpose set forth.

4. The combination of the water-chamber D made with a sloping upper shell $a$, and cream-chamber B provided with stops $d$, with the paddles $g$ $g$, rendered capable of being revolved horizontally, substantially as and for the purpose set forth.

Witnesses:     JAMES E. MITCHEL.
HUGH FINLAYSON,
WM. ALLCHIN.